(12) United States Patent
Krämer et al.

(10) Patent No.: US 7,950,320 B2
(45) Date of Patent: May 31, 2011

(54) BRAKE BOOSTER FOR MOTOR VEHICLES

(75) Inventors: Horst Krämer, Ginsheim-Gustavsburg (DE); Michael Haber, Berlin (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 665 days.

(21) Appl. No.: 11/631,998

(22) PCT Filed: Jul. 11, 2005

(86) PCT No.: PCT/EP2005/053308
§ 371 (c)(1),
(2), (4) Date: Jun. 4, 2008

(87) PCT Pub. No.: WO2006/005742
PCT Pub. Date: Jan. 19, 2006

(65) Prior Publication Data
US 2008/0245221 A1  Oct. 9, 2008

(30) Foreign Application Priority Data
Jul. 10, 2004  (DE) .......................... 10 2004 033 523

(51) Int. Cl.
B60T 13/72  (2006.01)
B60T 13/57  (2006.01)

(52) U.S. Cl. ........................................ 91/367; 91/376 R

(58) Field of Classification Search .................... 91/367, 91/376 R
See application file for complete search history.

(56) References Cited

U.S. PATENT DOCUMENTS

| 6,227,099 B1 * | 5/2001 | Kahrs et al. ..................... 91/367 |
| 6,332,391 B1 | 12/2001 | Ikeda et al. |
| 6,516,704 B2 * | 2/2003 | Inoue et al. ................. 91/376 R |

FOREIGN PATENT DOCUMENTS

| EP | 0866758 | 7/2002 |
| FR | 2824033 | 10/2002 |

* cited by examiner

Primary Examiner — Thomas E Lazo

(57) ABSTRACT

Disclosed is a brake booster for motor vehicles, the control valve (12) of which is operable, irrespective of an actuating rod (7) that displaces a valve piston (9), via an electromagnet (20), which actuates a third sealing seat (24) allowing ventilation of the working chamber (3). The third sealing seat (24) is provided on a sleeve (32) that cooperates with the electromagnet (20), and a ring (36) is arranged, which is displaceable in relation to the third sealing seat (24) and is supported on the sleeve (32) by the intermediary of an elastic or compressible element (37). In order to improve the dynamics and the sound behavior of the brake booster, the ring (36) is arranged radially within the sleeve (32) in such a manner that its areas (33), by which it is in contact with the valve body (10), at least partly release the passages (19) provided in the valve body (10).

7 Claims, 2 Drawing Sheets

BRAKE BOOSTER FOR MOTOR VEHICLES

BACKGROUND OF THE INVENTION

The present invention relates to a brake booster for motor vehicles comprising a booster housing, the interior space of which is subdivided by a movable wall into a low-pressure chamber and a working chamber, and with a control housing that carries the movable wall, in which a control valve is arranged which controls a pneumatic pressure difference acting on the movable wall and is operable both by an actuating rod by means of a valve piston and, irrespective of the actuating rod, by an electromagnet, the said control valve being comprised of three sealing seats which are arranged concentrically to one another and of a valve body, which cooperates with the sealing seats and is furnished with axial passages, with the first sealing seat being provided in the control housing and the second sealing seat being provided on the valve piston, while the third sealing seat is provided on a sleeve that cooperates with the electromagnet, and with a ring being arranged so as to be displaceable in relation to the third sealing seat, said ring being supported on the sleeve by the intermediary of an elastic valve body or compressible element, the fringe area of the element close to the valve body including contact areas that are separated by radial apertures, and which is arranged in the release position axially offset towards the valve body with regard to the third sealing seat.

EP 0 866 758 B1 discloses a brake booster of this type. In the prior art brake booster, however, the radial distance between the second sealing seat provided at the valve piston and the third sealing seat is very small, so that the air flow cross-sections are greatly affected, impairing the dynamics of the desired control as well as its quality.

In view of the above, an object of the invention is to disclose measures avoiding the above-mentioned negative influence to the largest degree possible. Another objective is to improve the sound behavior of the brake booster.

SUMMARY OF THE INVENTION

According to the invention, this object is achieved in that the ring is arranged radially within the sleeve in such a manner that its areas, by which it is in contact with the valve body, at least partly release the passages provided in the valve body.

To render the idea of the invention more specific, according to a favorable improvement of the invention, both the sleeve and the ring include at least one aperture to connect the pneumatic chamber limited by the sleeve or the ring, respectively, to the working chamber, with the elastic or compressible element being arranged behind the aperture in the direction of actuation of the control valve.

In another favorable embodiment of the subject matter of the invention, the elastic or compressible element is designed as an ondular washer.

In another alternative solution, the ring includes catch elements in its area remote from the valve body, which interact with recesses designed in the sleeve in such a fashion that the ring and the sleeve form a detachable subassembly.

In another alternative of the subject matter of the invention, the areas of the ring, by which it is in contact with the valve body, have a larger wall thickness.

According to a preferred embodiment of the invention, the valve body includes two sealing lips of different diameters, which cooperate with two coaxial guide surfaces of a guide part that is immovably arranged in the control housing, the said guide part limiting a pneumatic chamber to which the pneumatic pressure that prevails in the working chamber can be applied.

In another favorable embodiment of the subject matter of the invention, a transverse member is provided that bounds the return movement of the valve piston, and the elastic or compressible element is arranged behind the transverse member in the direction of actuation of the valve piston.

BRIEF DESCRIPTION OF THE DRAWINGS

Hereinbelow, the invention will be explained in detail in the following description by making reference to the accompanying drawings. In the drawings.

DETAILED DESCRIPTION OF THE DRAWINGS

Figure 1:
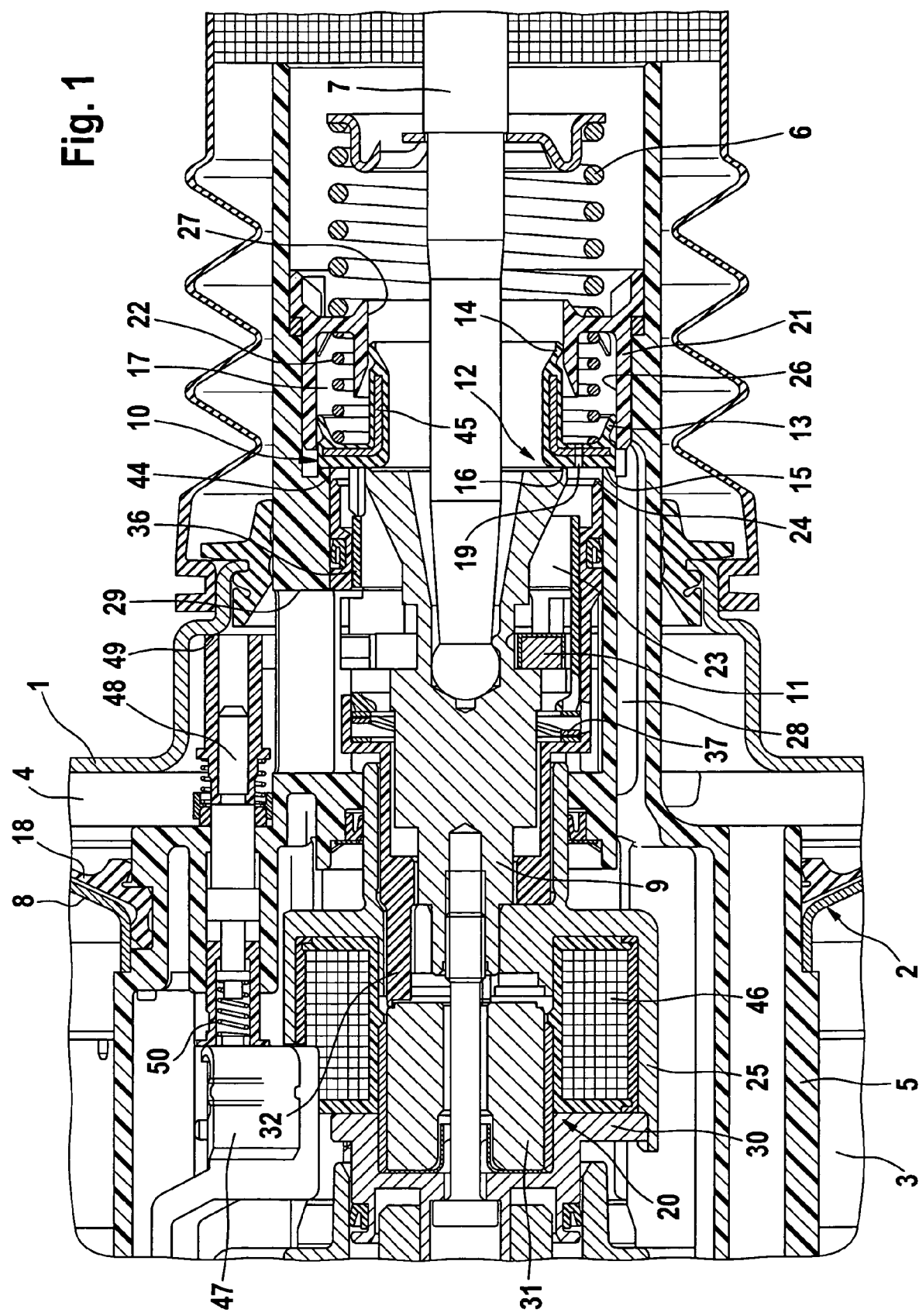
FIG. 1 shows a longitudinal cross-sectional view, partly broken off, of the pneumatic control assembly of the brake booster of the invention, in the inactive ready position.

The booster housing 1 (shown only schematically) of the vacuum brake booster of the invention is subdivided by an axially movable wall 2 into a low-pressure chamber 3 and a working chamber 4. The axially movable wall 2 is composed of a sheet-metal deepdrawn diaphragm plate 8 and a flexible diaphragm 18 abutting thereon and forming a rolling diaphragm as a sealing between the outside periphery of the diaphragm plate 8 and the booster housing 1 (not shown).

A control valve 12 operable by an actuating rod 7 is accommodated in a control housing 5, which is sealingly guided in the booster housing 1 and carries the movable wall 2, and comprises a first sealing seat 15 provided on the control housing 5, a second sealing seat 16 provided on a valve piston 9 that is connected to the actuating rod 7, and a valve body 10 of L-shaped cross-section, which cooperates with both sealing seats 15, 16 and is guided in a guide part 21 that is arranged in the control housing 5 in a sealed and immovable manner, the said valve body being urged against the valve seats 15, 16 by means of a valve spring 22 that is supported on guide part 21. In this arrangement, the valve body 10 includes two coaxially designed sealing lips 13, 14 of different axial length, which cooperate with two coaxial cylindrical guide surfaces 26, 27 of the guide part 21. The guide part 21 limits a pneumatic chamber 17, which can be actuated upon by the pneumatic pressure that prevails in the working chamber 4 through axial passages 19 provided in the valve body 10. The working chamber 4 is adapted to be connected to the low-pressure chamber 3 through a channel 28 that extends laterally in the control housing 5.

A resetting spring (not shown in the drawing), which is supported on the vacuum-side end wall (not either shown) of the booster housing 1, maintains the movable wall 2 in the initial position shown. Further, there is provision of a second compression spring or piston-rod restoring spring 6, which is supported indirectly on the actuating rod 7, on the one hand, and on the guide part 21, on the other hand, and the force of which spring ensures a preload of the valve piston 9 or its sealing seat 16, respectively, in relation to the valve body 10.

To be able to connect the working chamber 3 to the atmosphere when the control valve 12 is operated, a roughly radially extending channel 29 is designed in the control housing 4. The return movement of the valve piston 9 at the end of a brake operation is limited by a transverse member 11, which bears against a stop provided in the booster housing 1 in the release position of the vacuum booster as shown in the drawing.

As can be taken from the drawing in addition, the valve body 10, which is reinforced by means of a metallic reinforcing profile 45, includes an annular sealing surface 44, which cooperates with the two sealing seats 15, 16 and is provided with several axial passages 19. The flow channels (not referred to in detail), which are formed of the passages 19 and openings in the sealing surface 44, connect the pneumatic chamber 17 to an annular chamber that is limited by the sealing seats 15, 16 and is in communication with the above-mentioned pneumatic channel 29. Thus, the pneumatic chamber 17, that is disposed on the side of the valve body 10 remote from the sealing surface 44, is in permanent communication with the working chamber 4, and pneumatic pressure compensation occurs at the valve body 10.

The arrangement described above consequently enables reducing the difference between the response force of the brake booster and the resetting force acting on the valve piston to such effect that, with a response force that stays constant, it is possible to increase the resetting force or, with a resetting force that stays constant, it is possible to reduce the response force, with the result of improving the hysteresis of the brake booster of the invention.

Figure 2:
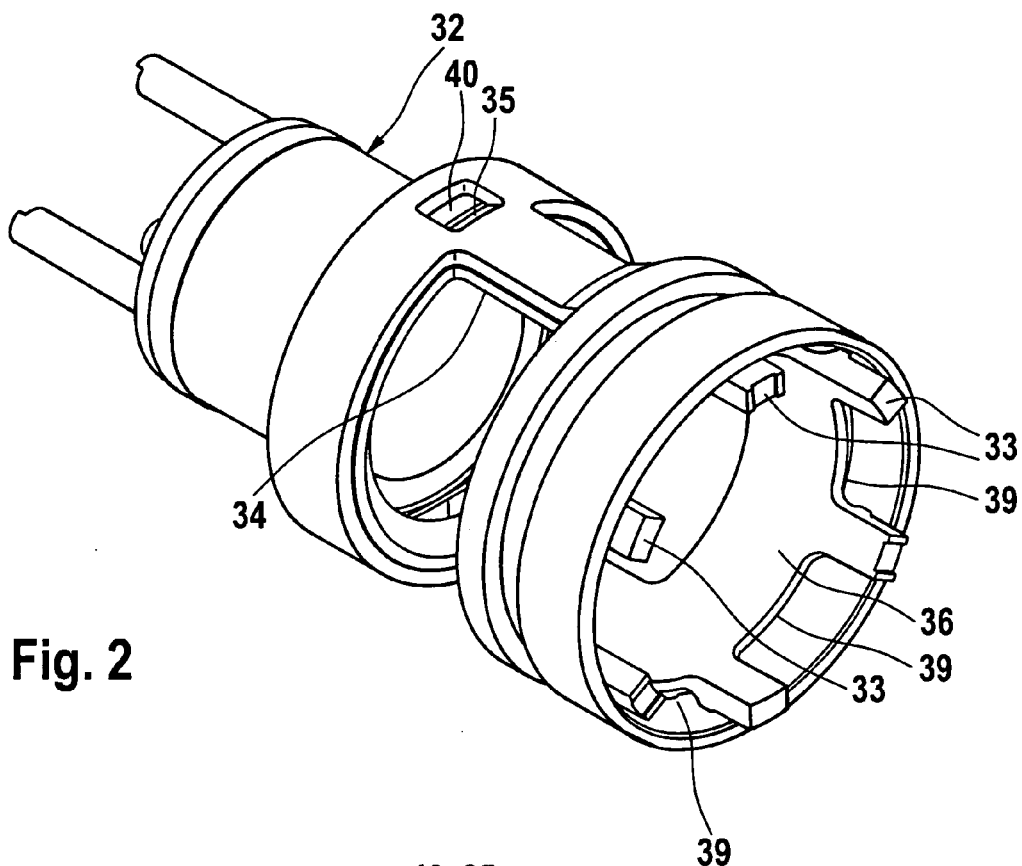
FIG. 2 shows a perspective view of a subassembly, which is part of the pneumatic control valve of the brake booster of the invention.
Figure 3:
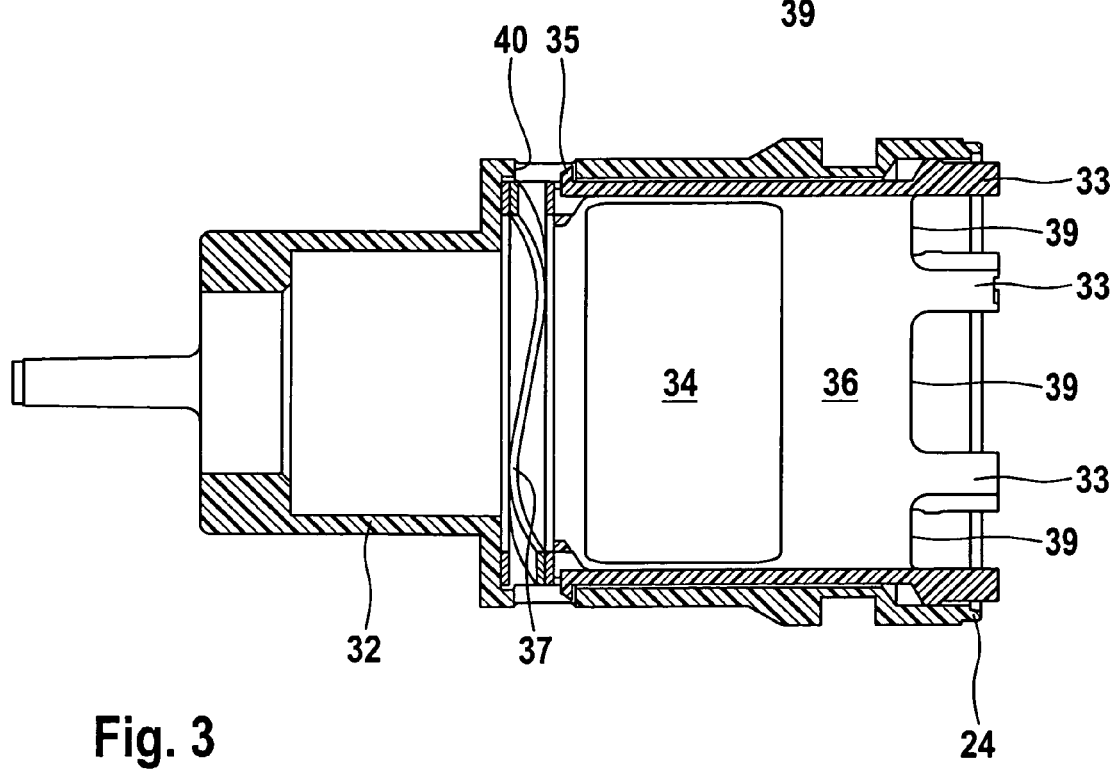
FIG. 3 is an axial cross-sectional view of the subassembly of FIG. 2.

In order to initiate an assist actuation of the brake booster of the invention, which is independent of the actuating rod 7, a third sealing seat 24 is provided radially between the first sealing seat 15 and the second sealing seat 16 and is operable by means of an electromagnet 20, that is preferably arranged in a housing 25 rigidly connected to the valve piston 9 and, consequently, is displaceable along with the valve piston 9 in the control housing 5. The electromagnet 20 comprises a coil 46 accommodated in the housing 25 and an axially displaceably arranged cylindrical armature 31, which is partly guided in a closure member 30 closing the housing 25 and on which a sleeve 32 is supported, with the above-mentioned third sealing seat 24 being provided in the area of the sleeve facing the valve body 10. In the initial position of the armature 31 as shown in the drawing, the third sealing seat 24 is axially offset in relation to the second sealing seat 16 provided on the valve piston 9, so that a slot exists between the third sealing seat 24 and the sealing surface 44 of the valve body 10. Besides, there is provision of a ring 36 (see FIGS. 2 and 3 in particular), which is guided radially preferably within the sleeve 32 and, by the intermediary of an elastic or compressible element 37, is supported on the sleeve 32 in such a way that a relative movement is possible between the ring and the sleeve 32. The elastic or compressible element 37 is provided by an ondular washer in the embodiment shown. The fringe area of the ring 36 facing the valve body 10 is subdivided by radial apertures 39 into apertures 39, through which it is in contact with the valve body 10 and which are favorably designed in such a fashion that they at least partly release the apertures 19 provided in the valve body 10. In order to be able to connect a pneumatic chamber 23, that is limited by the sleeve 32 or the ring 36 in the control housing 5, to the working chamber 4, an aperture 34 is provided in the two mentioned parts. The arrangement of the above-mentioned ondular washer 37 in the mounted condition is preferably chosen in such a way that it is disposed behind the aperture 34 or the above-mentioned transverse member 11 when viewed in the direction of actuation of the control valve 12. Besides, the ring 36 includes catch elements or projections 35 in its area facing the ondular washer 37, which interact with recesses 40 provided in the sleeve 32 in such a fashion that the ring 36 along with the sleeve 32 forms a detachable subassembly.

In the embodiment of the brake booster of the invention as shown in the drawing, electric switching means 47, 48 are provided, which are important especially in brake operations, where the electromagnet 20 is driven in addition to the brake application by the driver in order to achieve full braking irrespective of the driver's wish (so-called brake assist function). It is especially significant then that the switching means 47, 48 are actuated during each brake operation. It must be safeguarded in addition that the electromagnet 20 is reliably disabled after termination of the brake operation assisted by independent force. The illustrated switching means are composed of a micro switch 47, which is preferably attached at the valve piston 9 or the housing 25 of the electromagnet 20 and includes two switch positions, and an actuating element 48, which actuates the micro switch 47 by a translational movement. Actuating element 48 is guided in a sealed manner in a bore provided in the control housing 5 and cooperates with a stop formed fast with the booster housing, which has been assigned reference numeral 49 and can be formed e.g. by a radial collar of the rear booster housing shell. A compression spring 50 is interposed between the actuating element 48 and the control housing 5 so that the end of the actuating element 48 remote from the micro switch 47 bears under preload against the stop 49.

The function of the brake booster that is operable by independent force, as described and illustrated herein, can be seen in the graph in FIG. 5 of the force-travel characteristic curves of the European patent EP 0 866 758 B1 cited as state of the art. Likewise, the individual phases of actuation of the control valve 12 when it is independently actuated by the electromagnet 20, basically correspond to those illustrated and described in detail in the mentioned publication so that there is no need for any detailed description and illustration thereof.

LIST OF REFERENCE NUMERALS 1 booster housing
2 movable wall
3 working chamber
4 low-pressure chamber
5 control housing
6 piston-rod restoring spring
7 actuating rod
8 diaphragm plate
9 valve piston
10 valve body
11 transverse member
12 control valve
13 sealing lip
14 sealing lip
15 sealing seat
16 sealing seat
17 chamber
18 rolling diaphragm
19 passage
20 electromagnet
21 guide part
22 valve spring
23 chamber
24 sealing seat
25 housing
26 guide surface
27 guide surface
28 channel
29 channel 30 closure member
31 armature
32 sleeve
33 area
34 aperture
35 catch element
36 ring
37 element
38 recess
39 aperture
40 recess
41
42
43
44 sealing surface
45 reinforcing profile
46 coil
47 micro switch
48 actuating element
49 stop
50 spring

The invention claimed is:

1. A brake booster for motor vehicles comprising:
a booster housing (1) having an interior space which is subdivided by a movable wall (2) into a low-pressure chamber (4) and a working chamber (3), and with a control housing (5) that carries the movable wall (2), in which a control valve (12) is arranged which controls a pneumatic pressure difference acting on the movable wall (2) and is operable both by an actuating rod (7) by means of a valve piston (9) and, irrespective of the actuating rod (7), by an electromagnet (20), the control valve having three sealing seats (15, 16, 24) which are arranged concentrically to one another and of a valve body (10), which cooperates with the sealing seats (15, 16, 24) and is furnished with axial passages (19), with the first sealing seat (15) being provided in the control housing (5) and the second sealing seat (16) being provided on the valve piston (9), while the third sealing seat (24) is provided on a sleeve (32) that cooperates with the electromagnet (20), and with a ring (36) arranged displaceably in relation to the third sealing seat (24), said ring being supported on the sleeve (32) by the intermediary of an elastic or compressible element (37), a fringe area of the element close to the valve body (10) including areas (33) that are separated by radial apertures (39) through which it is in contact with the valve body (10), and which is arranged in the release position axially offset towards the valve body (10) with regard to the third sealing seat (24), wherein the ring (36) is arranged radially within the sleeve (32) in such a manner that its areas (33), by which it is in contact with the valve body (10), at least partly release the passages (19) provided in the valve body (10).

2. A booster according to claim 1, wherein both the sleeve (32) and the ring (36) include at least one aperture (34) to connect the pneumatic chamber (23) limited by the sleeve (32) or the ring (36), respectively, to the working chamber (4), with the elastic or compressible element (37) being arranged behind the aperture (34) in the direction of actuation of the control valve (12).

3. A booster according to claim 1, wherein the elastic or compressible element (37) is designed as an ondular washer.

4. A booster according to claim 1, wherein the ring (36) includes catch elements (35) in its area remote from the valve body (10), which interact with recesses (40) designed in the sleeve (32) in such a fashion that the ring (36) and the sleeve (32) form a detachable subassembly.

5. A booster according to claim 1, wherein the areas (33) of the ring (36), by which it is in contact with the valve body (10), have a larger wall thickness.

6. A booster according to claim 1, wherein the valve body (10) includes two sealing lips (13, 14) of different diameters, which cooperate with two coaxial guide surfaces (26, 27) of a guide part (21) that is immovably arranged in the control housing (5), the said guide part (21) limiting a pneumatic chamber (17) to which the pneumatic pressure that prevails in the working chamber (4) can be applied.

7. A booster according to claim 1, wherein a transverse member (11) is provided that bounds the return movement of the valve piston (9), and in that the elastic or compressible element (37) is arranged behind the transverse member (11) in the direction of actuation of the valve piston (9).

* * * * *